Jan. 25, 1966
H. L. SHIRLEY
3,231,260
MOTION TRANSLATING DEVICE
Filed Jan. 2, 1964
2 Sheets-Sheet 1
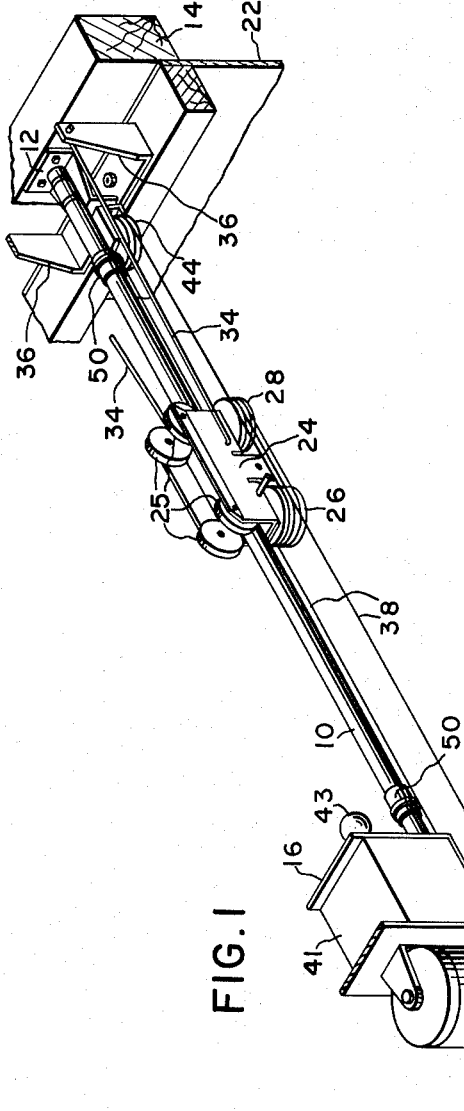
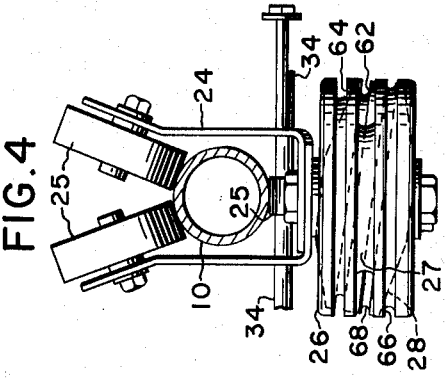
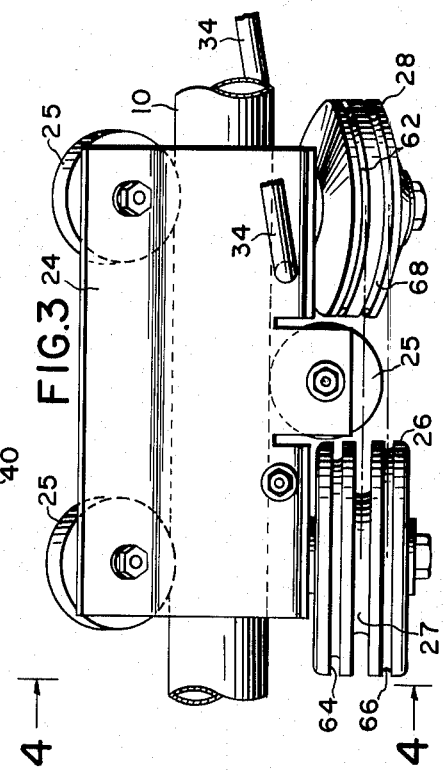
INVENTOR.
HOWARD L. SHIRLEY
BY *Nathan N. Kallman*
ATTORNEY Jan. 25, 1966     H. L. SHIRLEY     3,231,260
MOTION TRANSLATING DEVICE
Filed Jan. 2, 1964     2 Sheets-Sheet 2
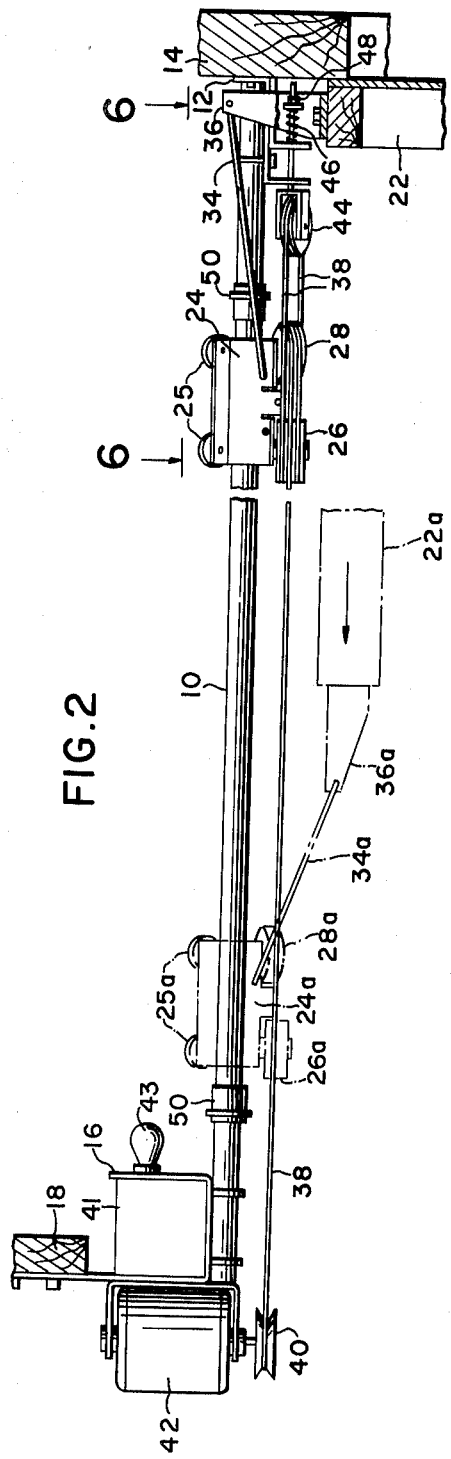
INVENTOR.
HOWARD L. SHIRLEY
BY Nathan N. Kallman
ATTORNEY

United States Patent Office 3,231,260
Patented Jan. 25, 1966

3,231,260
MOTION TRANSLATING DEVICE
Howard L. Shirley, 2741 Victoria Ave.,
San Carlos, Calif.
Filed Jan. 2, 1964, Ser. No. 335,334
9 Claims. (Cl. 268—59)

This invention relates generally to a motion translating device, and in particular to a novel and improved actuating device that may be adapted to operate a garage door.

Although the following description will be directed to the use of the invention as a garage door mechanism for the purpose of explanation, it should be noted that the scope of the invention is not limited to such an application only.

Presently known power-driven garage door mechanisms usually employ a reversible drive motor that is coupled through a gear assembly to a mechanical linkage, which serves to raise or lower the door by pivotable means. The gear assembly, which may include reduction gears, driving pinions and toothed racks, inter alia, functions to convert the rotary characteristic of the motor to a linear motion, the linear motion being characterized by a reduced speed relative to the angular velocity of the motor. In this manner, the garage door may be slowly raised or lowered in a smooth continuous way by means of the mechanical linkage coupled to the gear assembly. However, the gears which may be planetary, wormgears, or of the wormdrive screw type, for example, are relatively expensive, subject to wear, and require maintenance and repair.

A well known mechanical drive system is the differential pulley which provides a mechanical advantage and enables the elevation or lifting of relatively heavy loads. The conventional differential pulley system has not been employed for garage door operation, because the endless belt, chain or cable associated with the pulley system incorporates an intersecting loop portion which would not afford smooth, unobstructed operation when aligned in a straight line. The intersecting loop would suffer from frictional effects and would subject the pulley, chain, cable, or belt to undue wear if used in conventional form for garage door operation. It would be desirable to adapt the simple and yet advantageous features of a differential pulley system to an actuator apparatus for a power controlled garage door.

An object of this invention is to provide a novel and improved motion translating device.

Another object of the invention is to provide a novel means for converting relatively high speed rotary motion to a linear motion with a reduced speed.

Another object is to provide a novel and improved garage door actuator.

A further object to provide a garage door operator that utilizes a novel differential pulley system.

In accordance with this invention, a motion translating device incorporates a novel differential pulley system including two pairs of spaced pulleys. Each pair has pulleys of different diameters coaxially aligned in fixed relationship, and one pulley of each pair has substantially the same diameter as a corresponding pulley of the other pair. The pulleys are coupled to a rotary drive means and to an idler pulley by means of an endless cable, and are mounted to a movable carriage that may be transported linearly along a longitudinal element. One pulley pair is angularly displaced or rotationally offset about its axis relative to the other pulley pair to maintain corresponding pulley grooves in alignment.

In a particular embodiment of the invention, a garage door actuator comprises a movable carriage that is driven in a linear path by the inventive differential pulley system. The pulley system is energized by a reversible drive motor that provides rotational motion at a relatively high speed. The pulley system urges the carriage along a longitudinal guide shaft or tube, the combination serving to translate the rotary motion of the drive motor to a linear motion of the carriage, accompanied by a reduction in speed. The carriage is coupled to the garage door whereby travel of the carriage causes the door to move between open and closed positions.

The invention will be described in greater detail with reference to the drawing in which:

FIGURE 1 is an isometric view of the inventive actuator assembly;

FIGURE 2 is a side view of the actuator assembly, shown in two possible positions;

FIGURE 3 is an enlarged elevational view of the differential pulley system and carriage, in part, according to this invention;

FIGURE 4 is an end view taken through lines 4—4 of the structure depicted in FIGURE 3;

FIGURE 5 is a representational view of the novel differential pulley loop configuration, in accordance with this invention; and FIGURE 6 is a top view taken between lines 6—6 of FIGURE 2.

Similar numerals refer to similar elements throughout the drawing.

With reference to the figures of the drawing, and particularly FIGURES 1 and 2, an embodiment of this invention includes a tubular or cylindrical shaft 10 that is fastened at one end by means of a supporting bracket 12 to a wall 14 or other stationary structure in a garage. The other end of the shaft 10 is fastened to a second supporting bracket 16 by bolts, or other known means, and the bracket 16 is in turn supported to a beam 18 or other stable structure in the garage. The shaft 10 is preferably located above the center of the garage door 22 (partly shown in FIGURES 1 and 2). In FIGURE 2, the door 22 and associated pulley system are depicted in two possible attitudes, namely vertical or closed and substantially horizontal or raised, and the parts shown in raised position in broken lines are designated by the same reference numeral as the same parts shown in the closed position, but bear the subscript $a$.

A movable bracket or carriage 24 is mounted to travel freely along the shaft 10 by means of spaced roller wheels 25 that are attached to the carriage 24 and seated on the shaft 10. The carriage 24 supports a pair of spaced pulley wheels 26 and 28 that are fastened by bolts to the lower portion of the bracket 24. The bracket 24 is arranged such that the axis of the pulley wheel 26 is substantially vertical, whereas the axis of the pulley wheel 28 is tilted or offset from true vertical and also relative to the pulley wheel 26. The bracket 24 has a pair of apertured portions that engage a spring-biased coupling brace or connecting link 34, the ends of the coupling brace 34 being hooked in apertures formed in a pair of heavy gauge metal ears 36 attached to the garage door 22 in spaced horizontal relationship. By releasing the ends of the brace 34 from the apertured ears 36, the carriage 24 is decoupled from the garage door 22, which provides a simple way to make the garage door nonresponsive to the power drive, and subject to manual operation only.

The pulleys 26 and 28 are coupled by means of an endless cable 38, to be described in greater detail hereinafter, to the drive wheel 40 of a reversible motor 42, which is controlled by a switching means (not shown). The motor 42 is secured to the bracket 16 so that the common axis of this drive wheel 40 and motor 42 is substantially vertical and parallel to the axis of the pulley wheel 26. The bracket 16 also supports a housing or compartment 41 that encloses electrical controls. An electric light 43 may be coupled in the motor drive circuit for illumination during the period of operation of the door apparatus.

The endless cable 38 also engages an idler pulley or wheel 44 disposed at the opposite end of the tubular shaft 10 than the motor 42. The axis of the idler wheel 44 is tiled in opposition to the axis tilt of the pulley 28 whereby the cable 38 is directed to another plane or level, as will be described hereinafter with reference to FIGURE 5. A spring 46 is coupled to the idler 44 to afford constant tension of the cable 38 during operation of the apparatus. The cable tension may be adjusted by means of an adjustment nut 48 that varies the compression of the spring 46. The shaft 10 also carries stops or bumpers 50, preferably made of a resilient material, such as rubber, which limit the extent of travel of the movable carriage 24 along the guide shaft 10 in either direction. The major longitudinal path of the cable 38 is in alignment or parallelism with the shaft 10 on which the carriage 24 travels.

The endless cable 38 that engages the pulleys of the wheels 26 and 28, as well as the drive wheel 40 and idler wheel 44 traverses a major loop defined by the drive and idler wheels, and a pair of stacked minor loops that encompass the pulley wheels 26 and 28. As shown diagrammatically in FIGURE 5, the central axes of the wheel 40, 26, 28 and 44 are located in a line that is substantially in parallel alignment with the longitudinal axis of the shaft 10. The endless cable 38 which may be of wire rope, is driven by the motor 40 about this line, and travels in one direction across a central recessed portion 27 of the wheel 26 to the upper pulley 62 of the wheel 28 (see FIGURE 3). At this point, the cable 38 wraps around the pulley 62, is returned to the upper pulley 64 of the wheel 26, and arcs around this pulley 64 thence to the idler wheel 44. The pulleys 62 and 64 are substantially of the same diameter $d_1$. Thereafter the cable progresses to the lower pulley 66 of the wheel 26 and reverses to engage the lower pulley 68 of the wheel 28. Again, the cable 38 is turned around the pulley 68 and directed back to the drive wheel 40. The lower pulleys 66 and 68 have the same diameter $d_2$, which is greater than the diameters $d_1$ of the upper pulleys 62 and 64.

By virtue of the differences in diameters $d_1$ and $d_2$, the carriage 24 is urged along the shaft 10 at a reduced speed compared to the speed of the cable 38 when actuated by the motor drive. Since the motor is reversible and the moving parts of the actuator are reciprocal motion devices, the cable 38 and carriage 24 may travel in both directions along the shaft 10.

In operation, the reversible drive motor may drive the wheel 40 at any standard motor speed. The rotational motion can be translated by the novel differential pulley system of this invention to a linear motion with a velocity of about six inches per sec., by way of example, depending upon the relationship of the diameters $d_1$ and $d_2$ of the lower and upper pulleys respectively. By the use of different pulley wheels having different diameters, the speed of the carriage 24 along the shaft 10 may be selectively varied as desired.

With the inventive garage door actuator, any conventional remote control may be employed to energize the motor and actuate door operation. Also limit switches may be used to cut off the motor when the door reaches the fully open or closed positions.

It is understood that the scope of the invention is not limited to the particular embodiment set forth above. The mechanical couplings and linkages may be varied, and the forms and techniques of supporting the actuator elements in proper alignment for expedient power drive and motion translation may also differ.

What is claimed is:
1. A differential pulley system comprising:
   a longitudinal support element defining a longitudinal axis;
   a power drive means coupled to one end of said element;
   an idler wheel, said drive means and idler wheel mounted at opposite ends of said support;
   a plurality of pulley wheels spaced from each other and coupled to said support between said drive means and idler wheel, each pulley wheel having two pulleys of different diameters in coaxial alignment, the axis of one pulley wheel being tilted relative to the axis of the other pulley wheel and rotated relative to said longitudinal axis, the difference of the diameters of the two pulleys on each wheel being substantially the same for each wheel; and
   an endless loop element engaging said drive means, idler assembly and pulleys, all the portions of said loop element being substantially parallel.

2. A differential pulley system as in claim 1, wherein means are provided for maintaining the tension of said loop element constant.

3. A differential pulley system as in claim 1 wherein said pulleys are mounted to a movable carriage for propelling said carriage along said support element.

4. A differential pulley system as in claim 3, including means for limiting the travel of said carriage.

5. A differential pulley system comprising:
   first and second coaxially aligned pulleys, the first pulley having a smaller diameter than the second pulley;
   third and fourth coaxially aligned pulleys spaced from said first and second pulleys, said third pulley having the same diameter as said first pulley, said second pulley having the same diameter as said fourth pulley, the common axis of the third and fourth pulleys being offset relative to the common axis of the first and second pulleys;
   a rotary drive means;
   an idler wheel;
   an endless loop element coupled to said drive means, pulleys and idler wheel, following a path in order from said drive means to said third pulley, to said first pulley, to said idler wheel, to said second pulley, to said fourth pulley, and then returning to said drive means, such path being reversible with the reversal of said rotary drive means, whereby the rotary motion of said drive means is translated to a linear motion in a direction defined by the alignment of said drive means, pulleys and idler wheel.

6. A motion translating device for changing rotational motion to linear motion comprising:
   means for providing rotational motion;
   a longitudinal shaft;
   a movable carriage mounted to such shaft;
   a differential pulley system carried by such carriage including a first pair of coaxial pulleys having first and second diameters respectively;
   a second pair of coaxial pulleys spaced from said first pulley pair, and having the same first and second diameters respectively, the axis of said second pulley pair being tilted relative to the axis of said second pulley pair;
   an idler wheel mounted to said shaft and spaced from said pairs of pulleys, and having an axis tilted relative to said first and second pulley pairs; and
   an endless loop element engaging said rotational motion providing means, said first and second pairs of pulleys and said idler wheel, whereby the carriage is moved along said shaft whenever said rotational motion means is energized.

7. An apparatus for operating a garage door comprising:
   a drive motor means;
   a movable carriage;
   a longitudinal fixed element for supporting said carriage and for allowing movement of said carriage relative to said element;
   a differential pulley system including two pairs of spaced pulleys coupled to said carriage for driving said carriage in response to the rotation of said drive motor means;

and endless loop element for engaging said drive motor means and said pairs of pulleys so that said carriage may be propelled when said motor means is rotated;
a garage door that may be moved between two limiting positions; and
means coupling said garage door to said carriage so that said door is actuated to move when said carriage is propelled.

8. An apparatus for operating a door comprising:
a fixed shaft;
a movable carriage mounted to said shaft;
a power drive means fixed at one end of said shaft;
an idler wheel fixed at the other end of said shaft;
a differential pulley system including two pairs of spaced pulleys coupled to said carriage for driving said carriage in response to the rotation of said drive means;
said pulleys, drive means and idler wheel being aligned in parallelism with said shaft;
an endless loop element for engaging said drive means, and pulleys and said idler wheel;
a door that may be moved between two limiting positions coupled to said carriage; and
means for coupling said door to said carriage.

9. An apparatus as in claim 8 wherein said movable carriage is coupled to said door by means of spring-biased connecting links that are adapted to be decoupled.

References Cited by the Examiner
UNITED STATES PATENTS

| | | |
|---|---|---|
| 396,430 | 1/1889 | Reichel. |
| 2,861,799 | 11/1958 | Hartzler _____ 268—59 |
| 2,884,788 | 5/1959 | Clark _____ 74—95 X |

HARRISON R. MOSELEY, *Primary Examiner.*

J. K. BELL, *Assistant Examiner.*